United States Patent [19]
Wells et al.

[11] Patent Number: 5,978,808
[45] Date of Patent: *Nov. 2, 1999

[54] VIRTUAL SMALL BLOCK FILE MANAGER FOR FLASH MEMORY ARRAY

[75] Inventors: Steven Wells, Citrus Heights; Deborah See, Placerville, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,115

[22] Filed: Dec. 27, 1995

[51] Int. Cl.$^6$ ..................................................... G06F 17/30
[52] U.S. Cl. ........................................... 707/100; 707/200
[58] Field of Search ..................................... 395/611, 430; 707/100, 200, 205; 711/103, 205–209

[56] References Cited

U.S. PATENT DOCUMENTS

| | | | |
|---|---|---|---|
| 5,337,275 | 8/1994 | Garner | 365/189.01 |
| 5,357,475 | 10/1994 | Hasbun et al. | 395/430 |
| 5,404,485 | 4/1995 | Ban | 395/412 |
| 5,438,573 | 8/1995 | Mangan et al. | 371/10.3 |
| 5,457,658 | 10/1995 | Niijima et al. | 365/218 |
| 5,471,478 | 11/1995 | Mangan et al. | 371/10.3 |
| 5,485,595 | 1/1996 | Assar et al. | 711/103 |
| 5,544,356 | 8/1996 | Robinson et al. | 707/205 |
| 5,563,828 | 10/1996 | Hasbun et al. | 365/185.33 |
| 5,568,634 | 10/1996 | Gordons | 711/170 |
| 5,581,723 | 12/1996 | Hasbun et al. | 711/103 |
| 5,740,396 | 4/1998 | Mason | 711/103 |

OTHER PUBLICATIONS

M.C. Markowitz, "Nonvolatile Memories," EDN, vol. 34, No. 18, pp. 94–104 (Sept. 1989).
K. Robinson, "Trends in Flash Memory System Design," Wescon Conference Record 34, pp. 468–472 (Nov. 1990).
M. Levy, "Flash Memory Operates 10–20 Times Longer," Computer Technology Review, pp. 22 & 24 (Aug. 1990).

*Primary Examiner*—Maria N. Von Buhr
*Attorney, Agent, or Firm*—Blakely, Sokoloff, Taylor & Zafman LLP

[57] ABSTRACT

A file system created in a flash EEPROM memory array for an embedded system having a plurality of blocks of flash memory cells, each block being divided into identical-sized areas capable of being addressed, the file system including a data structure positioned at a predetermined one of the areas on each block of a flash EEPROM memory array, the data structure storing a logical identification of data stored in each of the areas, the logical identifications of data being stored sequentially in the physical order of the areas on the block, a controller implemented process for searching the predetermined ones of the areas on each block to detect a logical identification of data, and means for accessing the physical area associated with any logical identification of data which is detected.

27 Claims, 5 Drawing Sheets

VIRTUAL SMALL BLOCK FILE MANAGER FOR FLASH MEMORY ARRAY

BACKGROUND OF THE INVENTION

1. Field Of The Invention

This invention relates to electronic storage systems utilizing flash EEPROM memory and, more particularly, to methods and apparatus for managing files in flash EEPROM systems.

2. History Of The Prior Art

Recently, flash EEPROM storage devices have been used to provide a new form of memory array. A flash EEPROM memory array is constructed of a large plurality of floating-gate metal-oxide-silicon field effect transistor devices arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. This charge (typically called a "zero" or programmed condition) or its absence (a "one" or erased condition) may be detected when the device is read.

These flash memory arrays may be designed to accomplish many of the operations previously accomplished by other forms of memory in digital systems and especially in computer and control systems. For example, flash memory is being used to replace various read-only memories such as the basic input/output startup (BIOS) memory of a computer system. The ability to program flash memory in place offers substantial advantages for BIOS and similar read only memories over more conventional EPROM memory. Because of this ability, its great insensibility to mechanical shock, and its very high reliability, flash memory is also being used in embedded systems to store data generated by operations of associated systems. More recently, flash memory has been used to provide a smaller lighter functional equivalent of an electro-mechanical hard disk drive. Flash memory is useful for this purpose because it may be read more rapidly and is not as sensitive to physical damage as an electro-mechanical hard disk drive. Flash drive memories are especially useful in portable devices where space is at a premium and weight is extremely important.

In general, a flash EEPROM memory array is divided into blocks which are connected so that each entire block of memory cells are erased simultaneously. An erasure places all of the memory cells in the block into the erased or one condition. Thereafter, a memory cell may be individually programmed to store data. Since all of the memory transistors of a block of the array are joined so that they are erased together, a cell in a programmed condition cannot be switched to the erased state until the entire block of the array is erased. Thus, out-of-date information cannot be erased without erasing all of the valid information that remains in the block along with the invalid information. The result of this is that, unlike other memories in which changed data is written (essentially instantaneously) directly in place of the data it replaces, a flash EEPROM memory array requires a time consuming erasure process before it may be rewritten. Consequently, when the information at a data entry changes in flash memory used to store changing information, the new information is written to a new memory area rather than written over the old data; and the old data is marked as invalid. Then, after a block has filled and a sufficient portion of that block has been marked invalid, all valid information remaining in the block is written to a clean memory area; and the entire block is erased, typically using a background process.

It will be understood by those skilled in the art that the use of these complicated processes by which data is written to and erased from a flash memory array means that data once stored in the array at a particular physical position is very likely to move to other physical positions, either as the data is changed or as the erasure process is implemented. Since data in memory is only useful if it may be retrieved and utilized, it is very important that a flash memory management system be provided for tracking the data stored in any flash memory array which stores changing data.

There have been a number of flash memory management systems designed to work with different flash EEPROM memory arrays which handle changing data. However, those memory management systems known to the prior art typically attempt to implement all of the functions of an electro-mechanical hard disk drive which such a flash drive typically emulates. This tends to eliminate the use of flash EEPROM arrays in small embedded systems. Embedded systems which utilize flash memory arrays typically are portable and utilize a microprocessor or controller to run a limited number of processes which monitor conditions of the system and possibly vary the system operation in response to the monitoring. Embedded systems typically provide limited storage for either data or processes. On the other hand, such systems do not require all of the features of a comprehensive memory management system. Because of the limited storage available, a typical prior art flash memory management system would waste storage assets and place significant overhead requirements if used with most embedded systems.

For this reason, it is desirable to provide a new flash memory management system for an embedded system using a flash EEPROM array to store changing data which file system requires significantly less storage for its overhead data and processes while accurately tracking the position of the data stored by such a system.

SUMMARY OF THE INVENTION

It is, therefore, an object of the present invention to provide an improved memory management system for flash memory arrays used in embedded systems which file system is capable of accurately tracking the position of the data stored by such arrays while requiring less memory space typical file managers.

This and other objects of the present invention are realized by a memory management system created in a flash EEPROM memory module having a plurality of blocks of flash memory cells, each block being divided into identically-sized areas capable of being addressed, the memory management system including a data structure stored at a predetermined one of the areas on each block of a flash EEPROM memory array, the data structure storing a logical identification of each of the areas, the logical identifications of each of the areas being stored sequentially in the physical order of the areas on the block; and a controller-implemented process for searching the predetermined ones of the areas on each block to detect a logical identification of each area.

These and other objects and features of the invention will be better understood by reference to the detailed description which follows taken together with the drawings in which like elements are referred to by like designations throughout the several views.

Notation And Nomenclature

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

Detailed Description

Figure 1:
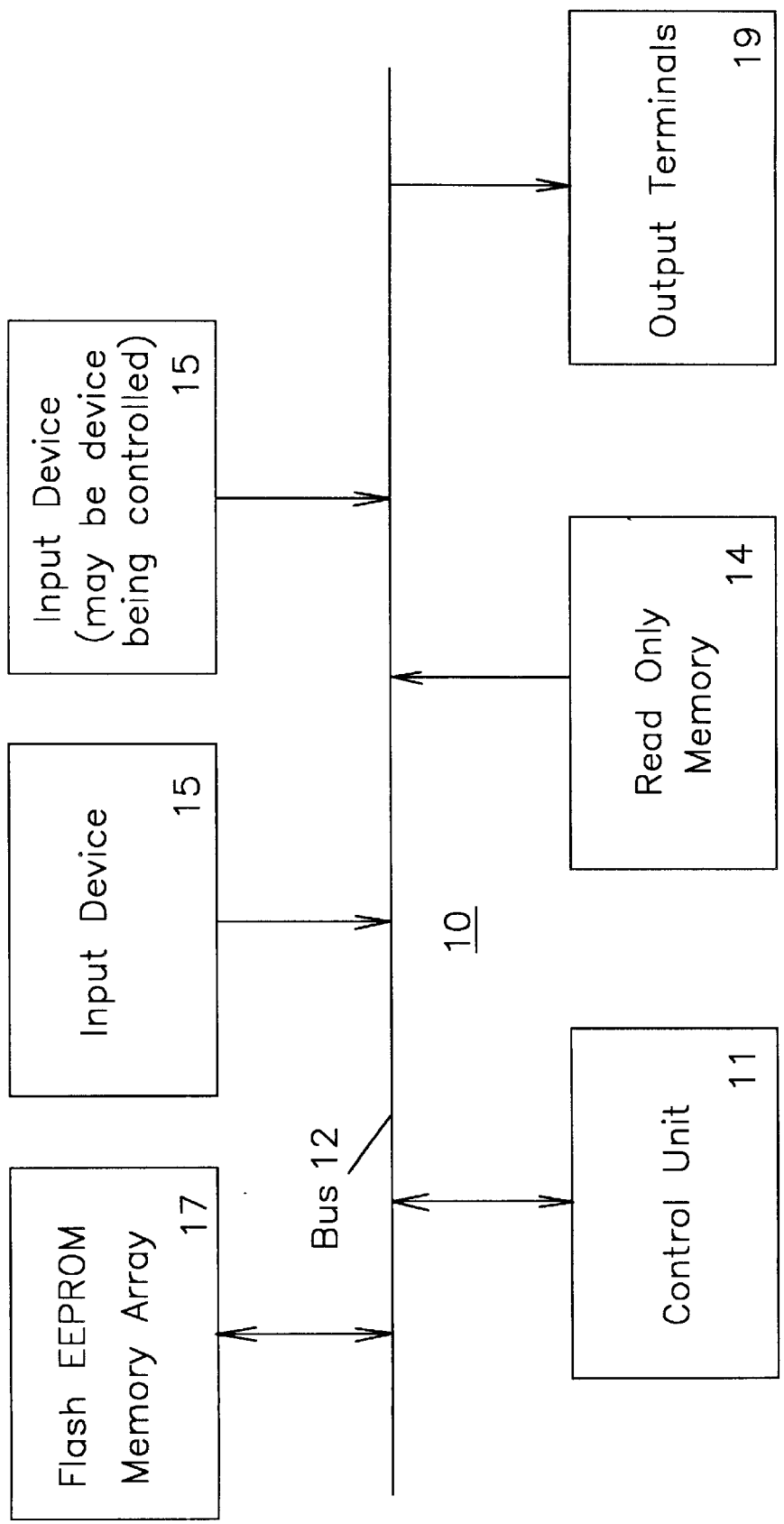
FIG. 1 is a block diagram of an embedded system designed in accordance with the present invention.

Referring now to FIG. 1, there is illustrated an embedded control system 10 configured in accordance with one embodiment of the present invention. The system 10 illustrated includes a control unit (controller) 11 which executes the various instructions provided to control the operations of the system 10. In particular systems, the control unit 11 may be implemented by an actual controller which is capable of only the operations necessary to carry out its limited functions; in other systems, the control unit 11 may be a microprocessor capable of general purpose use. Where the control unit 11 is a microprocessor, it is typically joined through a bus 12 to a read only memory (ROM) circuit 14 which provides the processes for controlling the operations conducted by the control unit 11. The memory circuit 14 may be an EPROM memory array, a flash EEPROM memory array, or another type of memory array used to provide control processes in the prior art. In a typical system 10 using a microprocessor, various input devices 15 are connected to the bus 12 to furnish data which the control unit 11 may write to a flash EEPROM memory array 17. A number of output terminals 19 may be provided. In a system 10 using a controller, the data input devices 15, the memory circuit 14, the flash memory array 17, the output terminals 19, and any associated components may be connected to the controller directly through individual interfaces rather than a bus. In a particular system, the processes stored in the memory circuit 14 (or some portion thereof) may be stored instead in the flash EEPROM memory array 17.

In some typical embedded systems, data is provided to the control unit 11 at the input devices 15 by an associated system being monitored and is stored in the flash EEPROM memory array 17. As the data is accumulated, processes are run which cause the control unit 11 to utilize that data to produce output signals which may be used for varying the operation of the associated system. In general, an embedded system provides only sufficient functional components and operating processes to carry out the purposes for which the control system is designed. Where the purpose of the system is to store data generated by some associated system and manipulate that data to provide specific outputs, the primary components and processes needed in the system 10 are those sufficient to accomplish the writing of the data provided by the associated system to the array 17, to read the data stored, and to manipulate that data in the manner prescribed by the processes. Since the system 10 need accomplish only a few primary tasks, the overhead required for these processes has typically been kept low so that the amount of the flash memory available for data storage may be kept as large as possible.

Figure 2:
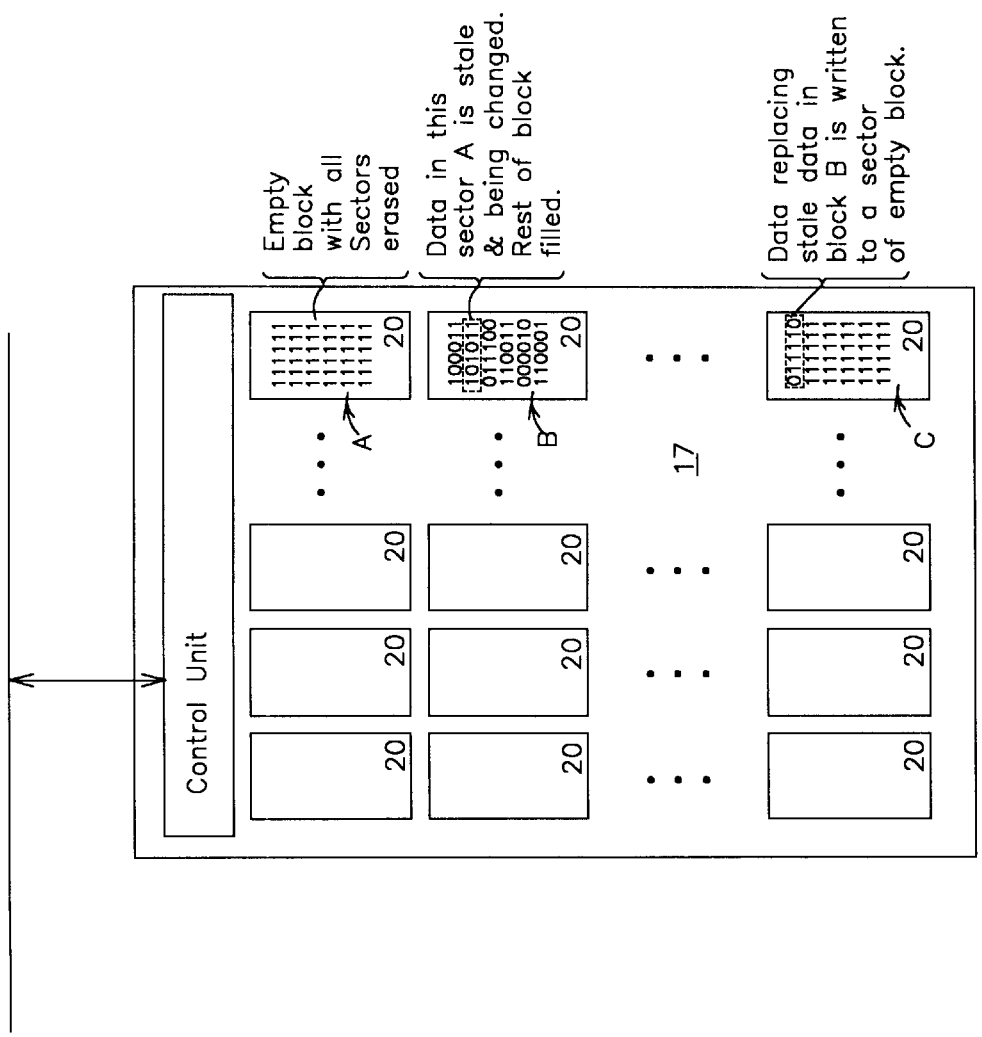
FIG. 2 is a block diagram of a flash memory array designed in accordance with the present invention for use in the system of FIG. 1.
Figure 3:
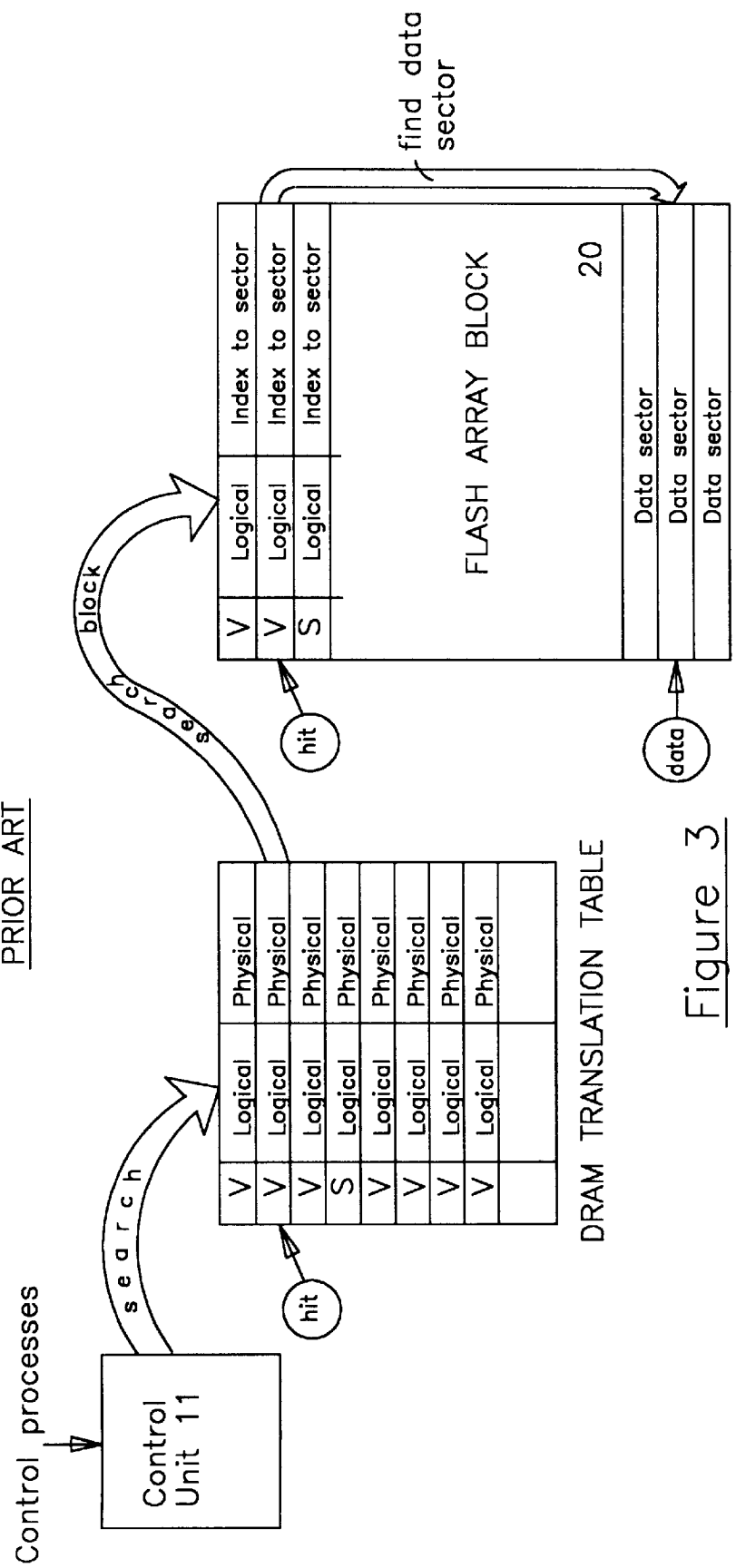
FIG. 3 is a diagram illustrating an individual block of a prior art flash memory array such as that illustrated in FIG. 2 and associated elements for providing a file tracking system.

In order to utilize flash memory, there must be flash memory management processes to track the positioning of data within the storage area for each file stored, to write the data as it is gathered and the results of any manipulation of the data, to modify the stored data as updated data is gathered, to read the data stored, and to erase the data when the data stored has become invalid. Typically, these processes utilize a significant amount of the data space available in the flash memory array. For example, the blocks of flash memory arrays (like other memory arrays) are divided into same-sized individually addressable physical areas in which data may be stored. FIG. 2 illustrates a number of blocks 20 of flash memory cells divided into a plurality of lines each representing such a physical area. These physical areas are typically referred to as sectors because they often store the same amount of data as do the "sectors" of electro-mechanical disk drives. One set of prior art flash memory management processes illustrated in FIG. 3 includes a tracking system which builds a table in associated random access memory for providing translations between logical addresses furnished by a host and physical addresses of those physical areas within the flash memory array at which data is actually stored. This tracking system also utilizes a portion (in the figure, the upper lines of flash array block) of each individually-erasable block in the array for storing the logical addresses and indices into the block to allow accessing the individual physical areas (in the figure, the data sectors) of the block at which a file is stored. One process of the flash memory manager run by the microprocessor or controller maintains the translation table as each new entry is made. Another process of the flash memory manager which is illustrated in FIG. 3 uses the logical address furnished by a host to look up a component and block physical address in the translation table in random access memory. The process uses this physical address to find the block on which the data is stored. The process then searches the block for the logical address of the data and, if the logical address is found, reads the index into the block designating the particular physical area at which the data is stored. The process then accesses the data at the indexed physical area.

As will be understood, the processes necessary to accomplish the tracking of data files in such a prior art system are significant and require a substantial amount of memory. Since the memory in which the data produced by the manipulations which the tracking processes carry out (and the tracking processes themselves in particular embodiments) are stored is the flash memory being managed by the processes, the use of this memory for the file tracking system reduces the flash memory available for other functions.

The present invention relates to apparatus and a process for accurately tracking the individual physical areas which store the changing data in a flash EEPROM memory array so that the physical areas may be accessed and the files stored therein may be written, read, and erased. The apparatus and process of the present invention particularly relate to a flash media manager which requires a minimal amount of storage and other system overhead so that it may advantageously be used in an embedded system using flash EEPROM memory to store changing data.

As pointed out above, FIG. 2 is a block diagram of a flash EEPROM memory module 17 which may be used in embedded systems such as that generally described in FIG. 1. The module 17 is divided into a number of blocks 20 each of which may be independently erased. Each of these blocks 20 includes flash memory cells joined in logical row and column arrangement. Any particular cell is accessed by selecting its row and column in the manner in which data is accessed in dynamic random access memory (DRAM).

When data is first written to a typical prior art flash memory array which stores changing data, that data is typically written to an empty (erased) block (see block 20A) on a sector by sector basis. As the data is written, an address translation data structure for the data being written is constructed in random access memory such as dynamic or static random access memory used with the flash memory array. Using prior art techniques as shown in FIG. 3, this typically requires that as a first sector of a file is written, a first element of the translation table be generated. Such an element of the translation table typically includes the logical address or identifier provided by the host and the physical address of the area to which the data is being written. When the data has been written, a data structure is created in the block in which the data is stored. This data structure includes the logical address or identifier assigned by the host to that file and an index to the new physical sector at which the data is stored. After the data structure has been written, it is validated.

When one block of a flash memory array has been filled (see block 20B), the writing of more data continues on a next empty block. When the data in a file which is already stored at a particular physical area (sector) on a block is changed and must be rewritten, the data already stored at that sector (see sector A in block 20B in FIG. 2) cannot be erased unless all of the data on the block is erased. Consequently, the changed data is written to an empty sector on a block (see block 20C) which has not yet been filled.

When data is changed and the changed data is written to a different physical sector, a new data structure must be written on the block at which the new data is stored with the logical address assigned by the host and an index to the new physical position on the block at which the new data is written; the physical position with the stale data having that logical address must be invalidated; and the translation table must be changed so that a lookup of the logical address will indicate the new physical position for the data at that logical address.

Since new data cannot simply be written over old data in a flash array, the blocks of the flash array will gradually fill. To keep the array from filling, the media manager typically carries on a continuing background process by which the block having the smallest number of valid entries is erased. This process includes writing all valid entries on the block to empty space on a block which has not yet been filled, writing a new data structure for each valid entry which is rewritten with a logical address and an index to the physical area including the entry on the new block, updating the translation table data structure in the associated random access memory, marking all of the entries on the old block invalid, and finally erasing the old block so that it may be put back into use as an empty block.

Figure 4:
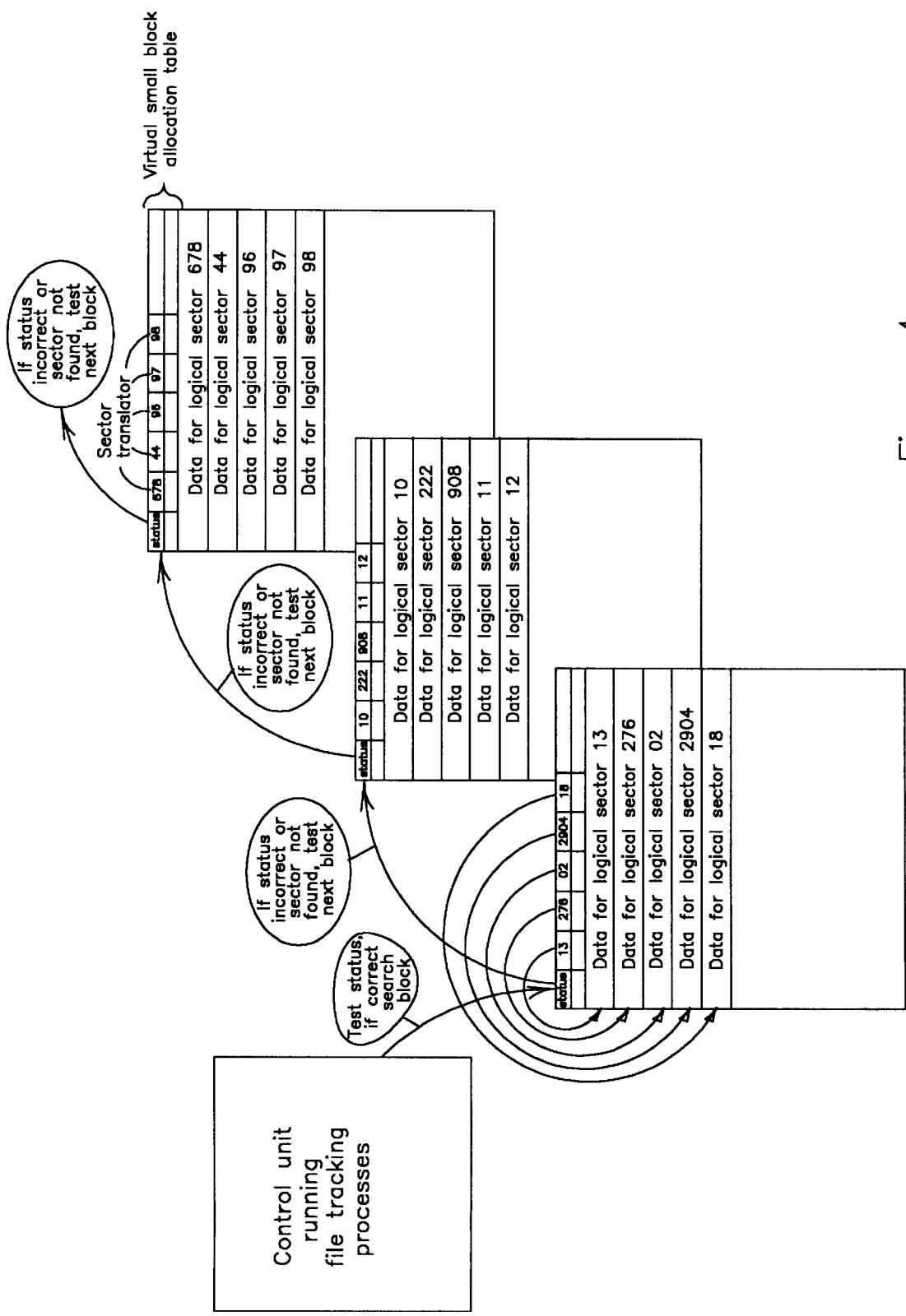
FIG. 4 is a diagram illustrating a number of individual blocks of a flash memory array such as that illustrated in FIG. 2 and associated elements and generally outlining a file tracking system and process in accordance with the present invention.

In contrast to this, the present invention provides a new flash memory manager which includes a system which substantially reduces both the number of operations required in order to keep track of the physical positions of data at logical positions assigned by a host and the amount of storage and other overhead necessary to track those positions. FIG. 4 is a block diagram illustrating an outline of the structure of the flash memory management system and the general process for carrying out this new file tracking system in accordance with the present invention.

The structure is created in the block of the flash EEPROM memory in which the files being tracked are stored. When data is first written to a physical area of a block of the flash memory array, the flash media manager begins the construction of a physical area allocation table in one sector of the block of the array by writing an entry for the first data to be stored in the block. A sector translator is included for each physical area (e.g., sector) of the block of the flash memory array in which data is stored. The sector translators for each block are placed sequentially in one sector of the block referred to as a "virtual small block allocation table." In this sector, the sector translators for all physical areas (sectors) on the block are arranged serially as each additional physical area is written. Each sector translator includes the logical address (logical sector number or other logical identifier) provided by the host for the data stored. In one typical embodiment (other embodiments may store different values), data is stored in physical areas which are sectors of 512 bytes each. The first sector (in the example of FIG. 4) is used to store the sector translators of the virtual small block allocation table and stores this logical identification. In one embodiment, each sector translator uses two bytes of the 512 bytes allotted to a sector. Data is entered in the physical areas of the block in the same sequential order as the sector translators are created with each data entry being allotted the same space, typically a sector. Thus, as may be seen in FIG. 4, the sector translators containing the logical sector numbers are arranged in sequential order so that the data stored on a block may be detected by a search process run by the control unit to find the desired logical sector number in the allocation table. Since data stored on a block may be identified by the logical sector number assigned by the host, its physical position on the block may be determined by its position in the sequence of sector translators which sequence is the same as the sequence of data sectors on the block (see the leftmost block of FIG. 4 in which each sector translator points to the sector in which data referred top be that logical sector number is stored). Once data has been stored in the flash memory array, the file may be accessed by the file tracking system running on the control unit searching the virtual small block allocation table for the logical address of the data.

Since the logical sector number furnished by a host is stored in the sector translator (which might include other data as well), such a logical sector number must be the only identical logical sector number in the particular flash memory array. Thus a search is able to determine the position of data on a particular block of the array by stepping serially through the sector translators of the virtual small block allocation tables of the blocks until the logical sector number is detected.

Those skilled in the art will understand that various blocks of the flash memory array will be in various conditions once the array has been used for some time. For example, in order to assure that sufficient space is available at all times for writing changed data to clean (erased) sectors of an array, in one embodiment a spare block of erased memory cells is kept; consequently, at least one block of such an array is in the completely erased or spare condition. Some other blocks of the array may be filled with data. Additional blocks may include only invalid data awaiting erasure. Other blocks may be in use and have additional empty sectors which are able to store new data. The various searches for data sectors carried out by the flash media manager may be significantly accelerated by storing an indication of the condition of each block of the array. For example, a search for space to store new data need only be conducted in those blocks which are empty and those which are in use but have room for data, while a search for a duplicate logical sector number need only be conducted in blocks containing valid data.

Figure 5:
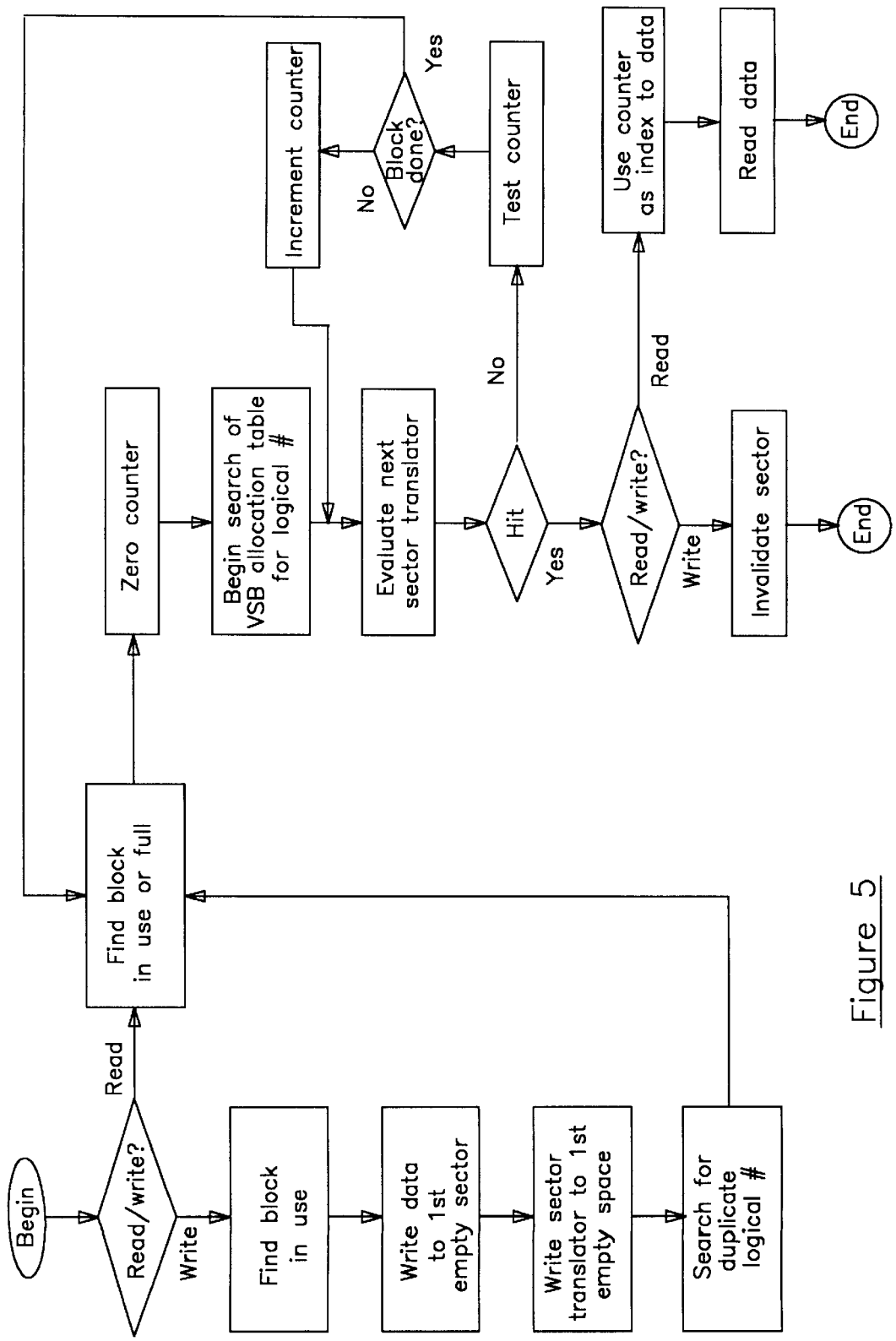
FIG. 5 is a flow chart illustrating a method in accordance with the present invention.

To accelerate the various searches, one embodiment uses the first sector translator in each virtual small block allocation table to store an indication of whether a block is a spare, is in use and has space for writing, is full, or has been marked invalid and is waiting for erasure (see FIG. 4). By providing this condition indication in the virtual small block allocation table of each block of the array, a rapid search may be conducted to find empty space to which data may be written. The control unit runs the tracking process as illustrated in FIG. 5 to conduct a search only for a block which is in use to which the data may still be written. When a block in this state is detected, the logical sector number for the data is written in the next available sector translator position, a position indicated in one embodiment by all of the bits of the position being erased. The data is written to the sequential sector associated with the sector translator to which the logical sector number has been written.

Once this has occurred, the tracking process conducts a complete search through the remainder of the blocks to determine whether a duplicate logical sector number exists (see FIG. 5). This complete search of the virtual small block allocation tables during a write operation need only be carried out in blocks which are in use or full since only these contain valid data. Consequently, the search only continues past the first two byte block status indicator in a virtual small block allocation table of blocks which are in use or are full. When the tracking process detects that a block is in use or is full, the search begins at the first sector translator in the allocation table and continues sequentially through the sector translators of the sector containing the virtual small block allocation table until the logical sector number is found. As each sequential header is searched, the process increments the number held by the counter. If the logical sector number is not found, the search continues in the next block in use or full until all blocks in this condition have been tested for a duplicate logical sector number. When the logical sector number is found, the entry may be invalidated by writing all bits of the sector translator for that, logical sector to zero. Alternatively, a status bit in the sector translator may be zeroed.

As with the write operation, if the operation is a read, the complete search of virtual small block allocation tables need only be carried out in blocks which are in use or full since only these blocks store valid data which may be read. The complete search of each virtual small block allocation table of a block which is in use or full is conducted in the manner described above and as shown in FIG. 5. The search of any allocation table begins at the first sector translator and continues sequentially through the sector translators of the sector containing the virtual small block allocation table until the logical sector number is found. The search within a virtual small block allocation table begins with the first sector translator and continues sequentially through each sector translator in order. If the logical sector number is not found, the search continues in the next block in use or full until the logical sector number is found. When the tracking process finds a logical sector number, the control unit knows the sector position by referring to the index to the sector translator in the sector holding the allocation table. Thus, when the logical sector number is found, the data is found at the physical position on the block having the same sector index as the sector translator has within the allocation table.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of reading a nonvolatile memory, comprising the steps of:
    a) receiving a sector number corresponding to sector data to be read from one of a plurality of blocks of nonvolatile memory, wherein each block stores a data structure, the data structure storing a sector translator for each corresponding sector stored within that block, wherein the data structure further indicates a block condition; and
    b) searching only blocks having a predetermined block condition to locate a block with a matching sector translator having a logical sector number matching the received sector number, wherein a location of the sector data within the located block is determined by a position of the matching sector translator within the data structure.

2. The method of claim 1 wherein the nonvolatile memory is flash electrically erasable programmable read only memory (EEPROM).

3. The method of claim 1 wherein a size of each sector is identical.

4. The method of claim 3 wherein each data structure is stored within a first sector of its associated block.

5. The method of claim 1 wherein the predetermined block condition is indicative of whether the block is full or in use.

6. The method of claim 1 wherein the matching sector translator identifies the sector data as valid.

7. The method of claim 1 further comprising the step of:
    c) reading the sector data from the location identified by the matching sector translator within the located block.

8. The method of claim 1 wherein step b) further comprising the steps of:
    i) sequentially comparing the logical sector number of each sector translator within a given block with the sector number to identify the matching sector translator until either 1) there are no more sector translators within the given block, or 2) the matching sector translator is found;
    ii) selecting another given block having the predetermined block condition, if the matching sector translator is not found; and iii) repeating steps i) through ii) until either 1) the matching sector translator is found or 2) all blocks having the predetermined block condition have been searched.

9. A method of writing a nonvolatile memory, comprising the steps of:
   a) receiving a sector number corresponding to sector data to be written to one of a plurality of blocks of nonvolatile memory, wherein each block stores a data structure indicative of the content and block condition of that block;
   b) locating a first block having a first predetermined block condition;
   c) writing a first sector translator to a next available position the data structure of the first block, wherein the first sector translator is assigned a logical sector number matching the sector number, wherein the position of the first sector translator within the data structure identifies a location of a corresponding sector within the first block; and
   d) writing the sector data to the location.

10. The method of claim 9 further comprising the steps of:
    e) locating a second sector translator within a plurality of blocks having a second predetermined block condition, wherein the second sector translator has a logical sector number matching the sector number, wherein the second sector translator indicates its corresponding sector has a status of valid;
    f) updating the second sector translator to indicate the status of invalid.

11. The method of claim 10 wherein the second predetermined block condition indicates that its associated block is either in use or full.

12. The method of claim 9 wherein the first predetermined block condition indicates its associated block is in use.

13. The method of claim 9 wherein the nonvolatile memory is flash electrically erasable programmable read only memory (EEPROM).

14. The method of claim 9 wherein a size of each sector is identical.

15. An apparatus comprising:
    a plurality of blocks of nonvolatile memory, wherein each block stores a data structure, the data structure storing a sector translator for each corresponding sector stored within that block, wherein the data structure further indicates a block condition; and
    a controller coupled to the plurality of blocks, wherein in response to a request to read sector data identified by a sector number, the controller searches only those blocks having a predetermined block condition to locate a block with a matching sector translator, the matching sector translator having a logical sector number matching the received sector number, wherein a location of the sector data within the located block is determined by the position of the matching sector translator within the data structure of the located block.

16. The apparatus of claim 15 wherein the nonvolatile memory is flash electrically erasable programmable read only memory (EEPROM).

17. The apparatus of claim 15 wherein a size of each sector is identical.

18. The apparatus of claim 15 wherein each data structure is stored within a first sector of its associated block.

19. The apparatus of claim 15 wherein the predetermined block condition is indicative of whether the associated block is full or in use.

20. The apparatus of claim 15 wherein the located block is a block within which the matching sector translator identifies the sector data as valid.

21. An apparatus comprising:
    a plurality of blocks of nonvolatile memory, wherein each block stores a data structure indicative of a content and a block condition of that block; and
    a controller coupled to the plurality of blocks, wherein in response to a request to write sector data identified by a sector number, the controller locates a first block having a first predetermined block condition and writes a first sector translator to a next available position within the data structure of the first block, wherein the first sector translator is assigned a logical sector number identical to the sector number, wherein the controller writes the sector data to a location identified by the position of the first sector translator.

22. The apparatus of claim 21 wherein the controller locates a second sector translator within a block having a second predetermined block condition, wherein the second sector translator has a logical sector number matching the sector number, wherein the second sector translator indicates its corresponding sector has a status of valid, wherein the controller updates the second sector translator to indicate the status of invalid.

23. The method of claim 22 wherein the second predetermined block condition indicates that its associated block is either in use or full.

24. The method of claim 21 wherein the first predetermined block condition indicates the associated block is in use.

25. The apparatus of claim 21 wherein the nonvolatile memory is flash electrically erasable programmable read only memory (EEPROM).

26. The apparatus of claim 21 wherein a size of each sector is identical.

27. The apparatus of claim 21 wherein each data structure is stored within a first sector of its associated block.

* * * * *